US007734809B2

(12) United States Patent
Joshi et al.

(10) Patent No.: US 7,734,809 B2
(45) Date of Patent: Jun. 8, 2010

(54) SYSTEM AND METHOD TO MAXIMIZE CHANNEL UTILIZATION IN A MULTI-CHANNEL WIRELESS COMMUNICATION NETWORK

(75) Inventors: Avinash Joshi, Orlando, FL (US); Surong Zeng, Altamonte, FL (US); Guenael T. Strutt, Lake Worth, FL (US)

(73) Assignee: MeshNetworks, Inc., Maitland, FL (US)

( * ) Notice: Subject to any disclaimer, the term of this patent is extended or adjusted under 35 U.S.C. 154(b) by 877 days.

(21) Appl. No.: 10/863,453

(22) Filed: Jun. 7, 2004

(65) Prior Publication Data

US 2004/0258040 A1 Dec. 23, 2004

Related U.S. Application Data

(60) Provisional application No. 60/475,882, filed on Jun. 5, 2003.

(51) Int. Cl.
*G06F 15/16* (2006.01)

(52) U.S. Cl. ....................... 709/235; 709/227; 709/228; 709/229; 709/230

(58) Field of Classification Search ................. 370/447, 370/443, 335, 348, 329; 709/230, 227, 228, 709/229, 235
See application file for complete search history.

(56) References Cited

U.S. PATENT DOCUMENTS 4,494,192 A 1/1985 Lew et al.
4,617,656 A 10/1986 Kobayashi et al.
4,736,371 A 4/1988 Tejima et al.
4,742,357 A 5/1988 Rackley
4,747,130 A 5/1988 Ho
4,910,521 A 3/1990 Mellon
5,034,961 A 7/1991 Adams
5,068,916 A 11/1991 Harrison et al.
5,231,634 A 7/1993 Giles et al.
5,233,604 A 8/1993 Ahmadi et al.
5,241,542 A 8/1993 Natarajan et al.
5,317,566 A 5/1994 Joshi
5,392,450 A 2/1995 Nossen
5,412,654 A 5/1995 Perkins
5,424,747 A 6/1995 Chazelas (Continued)

FOREIGN PATENT DOCUMENTS

CA 2132180 3/1996

(Continued)

OTHER PUBLICATIONS

Wong, et al., "Soft Handoffs in CDMA Mobile Systems," Dec. 1997, IEEE Personal Communications.

(Continued)

*Primary Examiner*—Karen C Tang
(74) *Attorney, Agent, or Firm*—Randi L. Karpinia; Joseph J. Buczynski

(57) ABSTRACT

A system and method for data transmission using a multi-channel medium access control (MAC) protocol to send small messages on the reservation channel directly without any RTS/CTS handshake or channel switching delays. The message is assigned a special type so that it can be distinguished from the RTS/CTS message. The message can also include information about congestion, activity, device type, mobility level, and so forth.

17 Claims, 3 Drawing Sheets

U.S. PATENT DOCUMENTS 5,502,722 A 3/1996 Fulghum
5,517,491 A 5/1996 Nanni et al.
5,555,425 A 9/1996 Zeller et al.
5,555,540 A 9/1996 Radke
5,572,528 A 11/1996 Shuen
5,615,212 A 3/1997 Ruszczyk et al.
5,618,045 A 4/1997 Kagan et al.
5,621,732 A 4/1997 Osawa
5,623,495 A 4/1997 Eng et al.
5,627,976 A 5/1997 McFarland et al.
5,631,897 A 5/1997 Pacheco et al.
5,644,576 A 7/1997 Bauchot et al.
5,652,751 A 7/1997 Sharony
5,680,392 A 10/1997 Semaan
5,684,794 A 11/1997 Lopez et al.
5,687,194 A 11/1997 Paneth et al.
5,696,903 A 12/1997 Mahany
5,701,294 A 12/1997 Ward et al.
5,706,428 A 1/1998 Boer et al.
5,717,689 A 2/1998 Ayanoglu
5,745,483 A 4/1998 Nakagawa et al.
5,774,876 A 6/1998 Wooley
5,781,540 A 7/1998 Malcolm et al.
5,787,080 A 7/1998 Hulyalkar et al.
5,794,154 A 8/1998 Bar-On et al.
5,796,732 A 8/1998 Mazzola et al.
5,796,741 A 8/1998 Saito et al.
5,805,593 A 9/1998 Busche
5,805,842 A 9/1998 Nagaraj et al.
5,805,977 A 9/1998 Hill et al.
5,809,518 A 9/1998 Lee
5,822,309 A 10/1998 Ayanoglu et al.
5,844,905 A 12/1998 McKay et al.
5,845,097 A 12/1998 Kang et al.
5,857,084 A 1/1999 Klein
5,870,350 A 2/1999 Bertin et al.
5,877,724 A 3/1999 Davis
5,881,095 A 3/1999 Cadd
5,881,372 A 3/1999 Kruys
5,886,992 A 3/1999 Raatikainen et al.
5,896,561 A 4/1999 Schrader et al.
5,903,559 A 5/1999 Acharya et al.
5,909,651 A 6/1999 Chander et al.
5,936,953 A 8/1999 Simmons
5,943,322 A 8/1999 Mayor et al.
5,987,011 A 11/1999 Toh
5,987,033 A 11/1999 Boer et al.
5,991,279 A 11/1999 Haugli et al.
6,028,853 A 2/2000 Haartsen
6,029,217 A 2/2000 Arimilli et al.
6,034,542 A 3/2000 Ridgeway
6,044,062 A 3/2000 Brownrigg et al.
6,047,330 A 4/2000 Stracke, Jr.
6,052,594 A 4/2000 Chuang et al.
6,052,752 A 4/2000 Kwon
6,064,626 A 5/2000 Stevens
6,067,291 A 5/2000 Kamerman et al.
6,067,297 A 5/2000 Beach
6,078,566 A 6/2000 Kikinis
6,104,712 A 8/2000 Robert et al.
6,108,738 A 8/2000 Chambers et al.
6,115,580 A 9/2000 Chuprun et al.
6,122,690 A 9/2000 Nannetti et al.
6,130,881 A 10/2000 Stiller et al.
6,132,306 A 10/2000 Trompower
6,147,975 A 11/2000 Bowman-Amuah
6,163,699 A 12/2000 Naor et al.
6,178,337 B1 1/2001 Spartz et al.
6,192,053 B1 2/2001 Angelico et al.
6,192,230 B1 2/2001 Van Bokhorst et al.
6,208,870 B1 3/2001 Lorello et al.
6,222,463 B1 4/2001 Rai
6,222,504 B1 4/2001 Oby
6,223,240 B1 4/2001 Odenwald et al.
6,240,083 B1 * 5/2001 Wright et al. ............... 370/348
6,240,294 B1 5/2001 Hamilton et al.
6,246,875 B1 6/2001 Seazholtz et al.
6,249,516 B1 6/2001 Brownrigg et al.
6,275,707 B1 8/2001 Reed et al.
6,285,892 B1 9/2001 Hulyalkar
6,304,556 B1 10/2001 Haas
6,327,300 B1 12/2001 Souissi et al.
6,349,091 B1 2/2002 Li
6,349,210 B1 * 2/2002 Li ............................. 455/450
6,359,872 B1 3/2002 Mahany et al.
6,366,568 B1 4/2002 Bolgiano et al.
6,400,726 B1 6/2002 Piret et al.
6,405,049 B2 6/2002 Herrod et al.
6,526,027 B1 * 2/2003 Yeom ......................... 370/312
6,807,165 B2 10/2004 Belcea
6,873,839 B2 3/2005 Stanforth
7,072,650 B2 7/2006 Stanforth
7,130,282 B2 * 10/2006 Black ......................... 370/296
7,142,527 B2 * 11/2006 Garcia-Luna-Aceves .... 370/336
2001/0053699 A1 12/2001 McCrady et al.
2002/0013856 A1 1/2002 Garcia-Luna-Aceves
2003/0179741 A1 * 9/2003 Goergen ..................... 370/351
2004/0143842 A1 7/2004 Joshi
2004/0258040 A1 * 12/2004 Joshi et al. .................. 370/349

FOREIGN PATENT DOCUMENTS

EP 0513841 A2 11/1992
EP 0627827 A2 12/1994
EP 0924890 A2 6/1999
FR 2683326 7/1993
WO WO 9608884 3/1996
WO WO 9724005 7/1997
WO WO 9839936 9/1998
WO WO 9912302 3/1999
WO WO 0034932 6/2000
WO WO 0110154 2/2001
WO WO 0133770 5/2001
WO WO 0135567 5/2001
WO WO 0137481 5/2001
WO WO 0137482 5/2001
WO WO 0137483 5/2001
WO WO 0235253 5/2002

OTHER PUBLICATIONS

Wong et al., "A Pattern Recognition System for Handoff Algorithms," Jul. 2000, IEEE Journal on Selected Areas in Communications, vol. 18, No. 7.
Andras G. Valko, "Cellular IP: A New Approach to Internet Host Mobility," Jan. 1999, ACM Computer Communication Review.
Richard North, Dale Bryan and Dennis Baker, "Wireless Networked Radios: Comparison of Military, Commercial and R&D Protocols," Feb. 28-Mar. 3, 1999, 2$^{nd}$ Annual UCSD Conference on Wireless Communications, San Diego, CA.
Benjamin B. Peterson, Chris Kmiecik, Richard Hartnett, Patrick M. Thompson, Jose Mendoza and Hung Nguyen, "Spread Spectrum Indoor Geolocation," Aug. 1998, Navigation: Journal of the Institute of Navigation, vol. 45, No. 2, Summer 1998.
Josh Broch, David A. Maltz, David B. Johnson, Yih-Chun Hu and Jorjeta Jetcheva, "A Performance Comparison of Multi-Hop Wireless Ad Hoc Network Routing Protocols," Oct. 25-30, 1998, Proceedings of the 4$^{th}$ Annual ACM/IEEE International Conference on Mobile Computing and Networking.
C. David Young, "USAP: A Unifying Dynamic Distributed Multichannel TDMA Slot Assignment Protocol".
Chip Elliott and Bob Heile, "Self-Organizing, Self-Healing Wireless Networks," 2000 IEEE.
J.J. Garcia-Luna-Aceves and Asimakis Tzamaloukas, "Reversing the Collision-Avoidance Handshake in Wireless Networks".

J.J. Garcia-Luna-Aceves and Marcelo Spohn, "Transmission-Efficient Routing in Wireless Networks Using Link-State Information".
J.J. Garcia-Luna-Aceves and Ewerton L. Madruga, "The Core-Assisted Mesh Protocol," Aug. 1999, IEEE Journal on Selected Areas in Communications, vol. 17, No. 8.
Ad Kamerman and Guido Aben, "Net Throughput with IEEE 802.11 Wireless LANs".
J. R. McChesney and R.J. Saulitis, "Optimization of an Adaptive Link Control Protocol for Multimedia Packet Radio Networks".
Ram Ramanathan and Regina Rosales-Hain, "Topology Control of Multihop Wireless Networks Using Transmit Power Adjustment".
Ram Ramanathan and Martha E. Steenstrup, "Hierarchically-Organized, Multihop Mobile Wireless Networks for Quality-of-Service Support".
Martha E. Steenstrup, "Dynamic Multipoint Virtual Circuits for Multimedia Traffic in Multihop Mobile Wireless Networks".
Zhenya Tang and J.J. Garcia-Luna-Aceves, "Collision-Avoidance Transmission Scheduling for Ad-Hoc Networks".
George Vardakas and Wendell Kishaba, "QoS Networking With Adaptive Link Control and Tactical Multi-Channel Software Radios".

* cited by examiner

SYSTEM AND METHOD TO MAXIMIZE CHANNEL UTILIZATION IN A MULTI-CHANNEL WIRELESS COMMUNICATION NETWORK

This application claims benefit under 35 U.S.C. §119(e) from U.S. Provisional Patent Application Ser. No. 60/475,882, filed on Jun. 5, 2003, the entire content of which is incorporated herein by reference.

BACKGROUND OF THE INVENTION

1. Field of the Invention

The present invention relates to a system and method to increase channel utilization in a wireless communication network using a multichannel medium access control (MAC) protocol. The messages are sent directly on the reservation channel without any request-to-send/clear-to-send (RTS/CTS) handshake. Each message can further be assigned a special type indicator allowing it to be easily distinguished from the RTS/CTS message.

2. Description of the Related Art

Wireless communications networks, such as mobile wireless telephone networks, have become increasingly prevalent over the past decade. These wireless communications networks are commonly referred to as "cellular networks", because the network infrastructure is arranged to divide the service area into a plurality of regions called "cells". A terrestrial cellular network includes a plurality of interconnected base stations, or base nodes, that are distributed geographically at designated locations throughout the service area. Each base node includes one or more transceivers that are capable of transmitting and receiving electromagnetic signals, such as radio frequency (RF) communications signals, to and from mobile user nodes, such as wireless telephones, located within the coverage area. The communication signals may include, for example, voice data that has been modulated according to a desired modulation technique and transmitted as data packets. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format, which enables a single transceiver at the base node to communicate simultaneously with several mobile nodes within its coverage area.

In recent years, a type of mobile communications network known as an "ad-hoc" network has been developed for use by the military. In this type of network, each mobile node is capable of operating as a base station or router for the other mobile nodes, thus eliminating the need for a fixed infrastructure of base stations. Details of an ad-hoc network are set forth in U.S. Pat. No. 5,943,322 to Mayor, the entire content of which is incorporated herein by reference.

More sophisticated ad-hoc networks are also being developed which, in addition to enabling mobile nodes to communicate with each other as in conventional ad-hoc networks, further enable mobile nodes to access a fixed network and thus communicate with other mobile nodes, such as those on the public switched telephone network (PSTN), and on other networks such as the Internet. Details of these advanced types of ad-hoc networks are described in U.S. Pat. No. 7,072,650 entitled "Ad Hoc Peer-to-Peer Mobile Radio Access System Interfaced to the PSTN and Cellular Networks", granted on Jul. 4, 2006, in U.S. Pat. No. 6,807,165 entitled "Time Division Protocol for an Ad-Hoc, Peer-to-Peer Radio Network Having Coordinating Channel Access to Shared Parallel Data Channels with Separate Reservation Channel", granted on Oct. 19, 2004, and in U.S. Pat. No. 6,873,839 entitled "Prioritized-Routing for an Ad-Hoc, Peer-to-Peer, Mobile Radio Access System", granted on Mar. 29, 2005, the entire content of each being incorporated herein by reference.

Communication between nodes in such networks, however, is often subject to collisions. One collision avoidance technique is carrier sense multiple access protocol (CSMA). In this technique, all nodes are forced to wait for a random number of timeslots and then sense the activity of the medium before starting a transmission. If the medium is sensed to be busy, the node freezes its timer until the medium becomes free again, thereby reducing the possibility of two nodes starting to send messages simultaneously. Therefore, as known to those skilled in the art, the range of the random delay, or the contention window, is set to vary with the load, and ARQ is used to finish the successful transmission process. After sending a packet, the sender waits for the "acknowledgement" (ACK) from the receiver. If ACK is not received within the specified time, the sender assumes that a collision has happened, and a retransmission is needed. In the case of a collision, the random delay range is increased progressively until a successful transmission occurs and the delay range is reset to the minimal value. In this case, the CSMA protocol handles ARQ by repeating the whole request to send/clear to send channel access sequence. Large delays are thus incurred due to retransmissions.

One problem associated with CSMA is that "carrier sense" only can detect the interference around the sender. However, of greater concern is interference at the receiver. In order to solve this problem, Phil Karn presented the Multiple Access with Collision Avoidance (MACA) protocol as described in the article entitled "MACA-A New Channel Access Method For Packet Radio", the entire content of which is incorporated herein by reference. In MACA, a node requiring to transmit data to a receiver first sends a request-to-send (RTS) packet to the receiver to clear the sender's area. Upon receiving RTS successfully, the receiver responds with a clear-to-send (CTS) packet to clear the receiver's area. The RTS/CTS carries the information, which includes source/destination addresses, transmission duration, and so forth, for the intended transmission. Therefore, all nodes overhearing the RTS/CTS will hold their transmission long enough to avoid collision.

MACA protocol introduced RTS-CTS-DATA process to overcome the problem in CSMA. In order to accelerate the confirmation of the correct message transmission, the link layer ACK is introduced in MACAW proposed in "MACAW: A Media Access Protocol for Wireless LAN's" by V. Bharghavan et al., the entire content of which is incorporated herein by reference. One data transmission in MACAW includes RTS-CTS-DATA-ACK exchanges between the sender and the receiver. A variant of MACAW is used in IEEE 802.11 and is known as CSMA/CA. The multichannel MAC design is an extension of MACA/MACAW/CSMA/CA protocols. One channel is reserved for the transmission of control packets such as RTS, CTS, and other channels are used for data packet transmission. The typical process is described below.

In such a process, all nodes in the network keep listening to the reservation channel. Before data packet transmission, RTS/CTS are exchanged between the source and destination via the reservation channel. In RTS/CTS, besides the source/destination addresses and transmission duration information, the information of selected data channel is also carried. Once the exchange of RTS/CTS is successful, both sender and receiver tune to the selected data channel to transmit the data packet and ACK. Upon receiving the ACK, both sender and receiver retune back to the reservation channel to prepare for the future transmission. If a collision happens, the backoff process similar to which is in CSMA will be performed to resolve the collision.

In the multichannel MACA/MACAW and CSMA/CA protocols, the control packet overhead and the tuning delays between reservation channel and data channels are very high which reduces the channel utilization. This problem is more serious when the data packet size is very small. However, in order to coordinate nodes in Ad-Hoc networks, it is very important to distribute node information among neighbor nodes in the form of short Neighbor Advertisement (NA) or short "Hello" message. Accordingly, a need exists for minimizing the transmission overhead for small size packet in the multichannel MACA/MACAW or CSMA/CA protocol.

SUMMARY OF THE INVENTION

An object of the present invention is to provide a system and method for reducing delays in data transmissions using carrier sense multiple access with collision avoidance or a multiple access with collision avoidance as a medium access control protocol.

Another object of the present invention is to provide a system and method for detecting small unicast messages, and where possible, sending such messages directly on the reservation channel between nodes without any request-to-send/clear-to-send handshake.

Another object of the present invention is to provide a system and method for detecting small broadcast messages, and where possible, sending such messages directly on the reservation channel between nodes without any request-to-send message.

Still another object of the present invention is to provide a system and method for assigning a special type indicator to each small message allowing each to be easily distinguished from an RTS/CTS message.

Still another object of the present invention is to provide a system and method for sending each small message at constant power and data rates so such additional information does not need to be transmitted.

Still another object of the present invention is to provide a system and method for providing each small message with bits containing information about congestion, activity, device type, mobility level, and so forth.

These and other objects are substantially achieved by a system and method for data transmission using a carrier sense multiple access with collision avoidance or a multiple access with collision avoidance as a medium access control protocol to detect and send small messages without requiring the receiving node to switch to an indicated data channel. These messages are sent directly on the reservation channel without any request-to-send/clear-to-send handshake, and are assigned a special type indicator allowing each to be easily distinguished from an RTS/CTS message. Each message can be sent at constant power and data rate so such additional information does not need to be transmitted. Each message can also include, but is not limited to, bits containing information about congestion, activity, device type, mobility level, and so forth. Unlike standard practice, this allows creation of a unique MAC message which can be used to send short data messages directly on the reservation channel in a multi-channel MAC and avoid the delays associated with channel switching at both transmitting and receiving nodes.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

In the embodiment of the present invention described below, a data transmission system and method is described in which a MAC protocol is used to detect and send small messages on a reservation channel without requiring the receiving node to switch to an indicated data channel. These messages are sent directly on the reservation channel without any request-to-send/clear-to-send handshake, and associated channel switching delays.

As noted above, in a typical multi-channel wireless communication network using MACA/MACAW or CSMA/CA as MAC protocol, broadcast messages are sent on a data channel. Since all nodes of the network are assumed to constantly listen to the reservation channel, an RTS is sent which informs the neighboring nodes that the next message will be a broadcast message, and will be transmitted after a gap on channel x, where channel x can be any of the available channels in the multi-channel network. Upon receiving this RTS message, all nodes retune to channel x and receive the message. Each node then tunes back to the reservation channel. However, this series of communications results in the following delays. An RTS delay results from the time spent in sending/receiving the initial announcement about the broadcast. A GAP delay results from the time between the RTS and the broadcast message, which overlaps with the returning delay. A Message delay results from the time spent in sending/receiving the broadcast message, and a Return to Reservation Channel delay results from the time required to retune back to the reservation channel.

During the above delays, or "time slices", no other transmissions can be made, as all the neighbor nodes need to listen to this broadcast packet. Also the nodes run into the risk of losing channel information and can cause hidden node problems which can result in packet collision and ultimately result in poor channel utilization. This process becomes increasingly more inefficient if the message sent on the data channel is comparable to the size of the RTS sent.

Therefore, if the message is small (i.e. comparable to the size of RTS message), the communication process becomes more efficient if the packet is sent on the reservation channel itself rather than the data channel. Such small messages include any number of communications, including a node "hello" or neighbor advertisement. Similarly, small unicast messages can also be sent directly on the reservation channel, thus avoiding RTS/CTS handshake overhead and tuning delays. Such messages can be exchanged in an illustrative network, such as the network 100 of FIG. 1.

Figure 1:
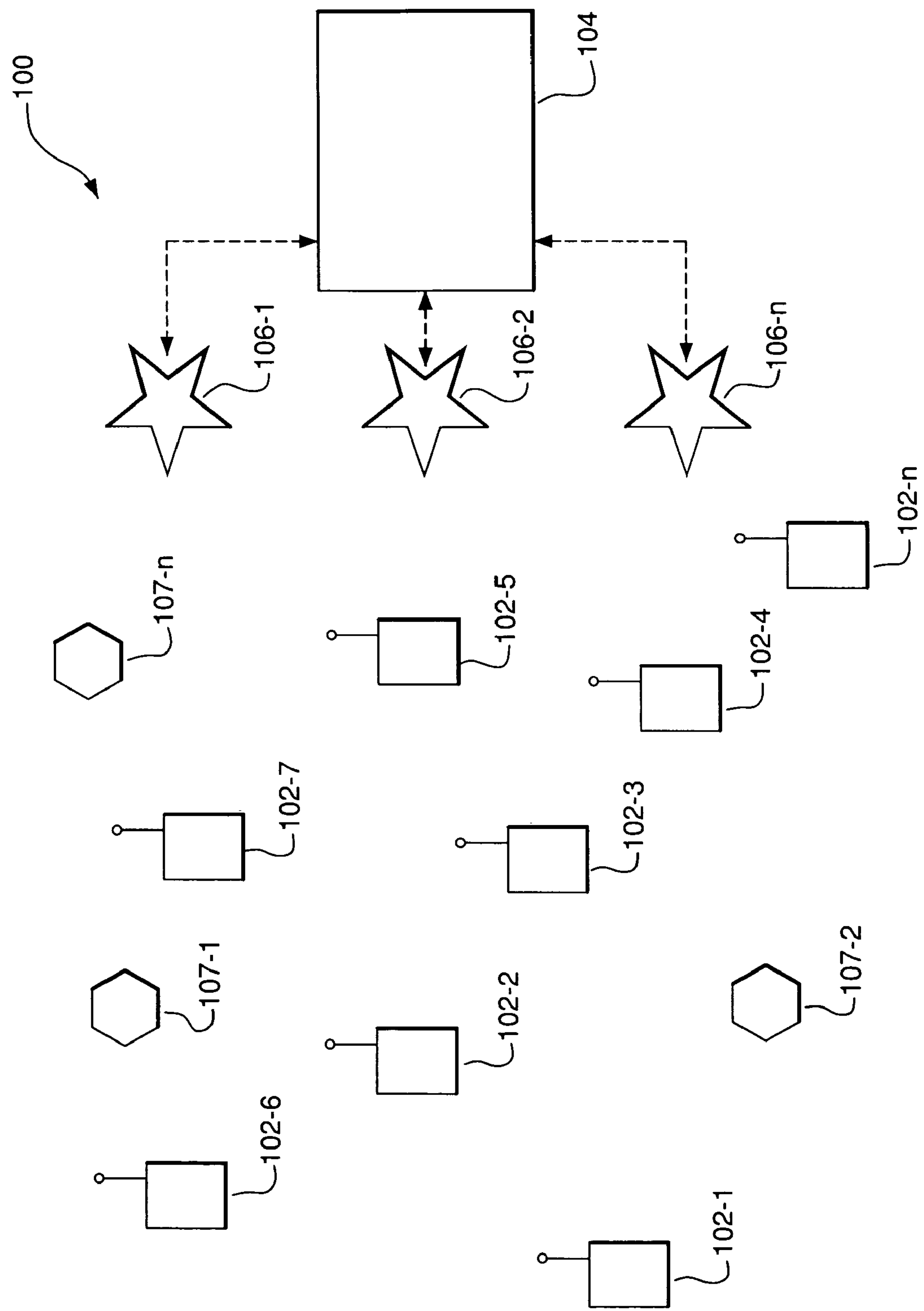
FIG. 1 is a block diagram of an example ad-hoc packet switched wireless communications network including a plurality of nodes in accordance with an embodiment of the present invention.

FIG. 1 is a block diagram illustrating an example of an ad-hoc packet-switched wireless communications network 100 employing an embodiment of the present invention. Specifically, the network 100 includes a plurality of mobile wireless user terminals 102-1 through **102-*n* (referred to generally as nodes 102 or mobile nodes 102), and can, but is not required to, include a fixed network 104 having a plurality of access points 106-1, 106-2, . . . 106-*n* (referred to generally as nodes 106 or access points 106), for providing nodes 102 with access to the fixed network 104. The fixed network 104 can include, for example, a core local access network (LAN), and a plurality of servers and gateway routers to provide network nodes with access to other networks, such as other ad-hoc networks, the public switched telephone network (PSTN) and the Internet. The network 100 further can include a plurality of fixed routers 107-1 through 107-*n* (referred to generally as nodes 107 or routers 107) for routing data packets between other nodes 102, 106 or 107. It is noted that for purposes of this discussion, the nodes discussed above can be collectively referred to as "nodes 102, 106 and 107**", or simply "nodes".

Figure 2:
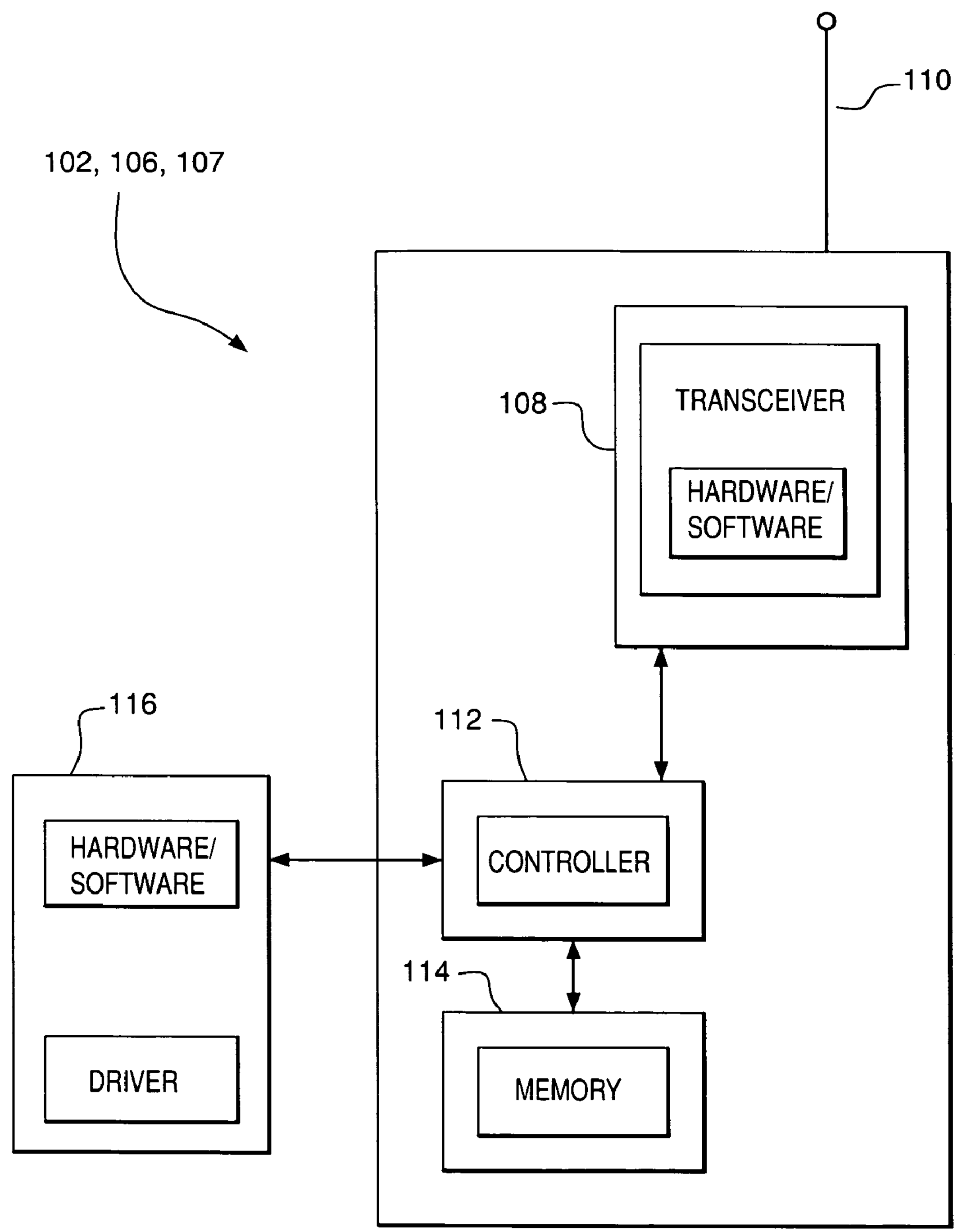
FIG. 2 is a block diagram illustrating an example of a mobile node employed in the network shown in FIG. 1.

As can be appreciated by one skilled in the art, the nodes 102, 106 and 107 are capable of communicating with each other directly, or via one or more other nodes 102, 106 or 107 operating as a router or routers for packets being sent between nodes, as described in U.S. Pat. No. 5,943,322 to Mayor, and in U.S. Pat. Nos. 7,072,650, 6,807,165 and 6,873,839, referenced above. As shown in FIG. 2, each node 102, 106 and 107 includes a transceiver 108 which is coupled to an antenna 110 and is capable of receiving and transmitting signals, such as packetized data, to and from the node 102, 106 or 107, under the control of a controller 112. The packetized data signals can include, for example, voice, data or multimedia information, and packetized control signals, including node update information.

Each node 102, 106 and 107 further includes a memory 114, such as a random access memory (RAM), that is capable of storing, among other things, routing information pertaining to itself and other nodes in the network 100. The nodes periodically exchange respective routing information, referred to as routing advertisements or routing table information, via a broadcasting mechanism, for example, when a new node enters the network or when existing nodes in the network move.

As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included. Additionally, each node includes the appropriate hardware and software to perform automatic repeat request (ARQ) functions, carrier sense multiple access with collision avoidance (CSMA/CA) protocols, and multiple access with collision avoidance (MACA) protocols, and MACA for Wireless (MACAW) protocols as set forth in greater detail below.

In a typical network as shown in FIG. 1, regular neighbor advertisements are sent between nodes 102, 104, 106 and 107, on a regular interval to validate the bidirectional link between the sending node and its neighbor nodes. Such updated advertisements also assist in the quick convergence if a mobile node happens to visit the area. Since this neighbor advertisement message is typically sent by a Neighbor Discovery Module at each node 102, 106 and 107, which lies above the Link Layer in a typical architecture, it adds the LLC header and MAC layer header which increases the size of the packet.

However, to minimize the delays associated with the communication of such messages on the data channel, the embodiment of the present invention determines the size of the message, and where practical to do so, sends the message on the reservation channel. For these "hello" and other small messages, each can be sent on the reservation channel directly without any RTS/CTS handshake. In accordance with an embodiment of the present invention, the message can be assigned a special type or type indicator allowing it to be easily distinguished from an RTS/CTS message. Broadcast messages can furthermore be shortened as they do not require a destination address in addition to the source address. In this example, all hello messages can be treated as broadcast messages.

Each such message sent on the reservation channel can be sent at constant power and data rate levels, thereby eliminating the need to transmit this additional information. Each message can also include, but is not limited to, information about congestion, activity, device type, mobility level and so forth. Additionally, such messages can be helpful in providing smooth handoffs and continuous connectivity as described in U.S. Patent Application Publication No. 20040143842, entitled "System And Method For Achieving Continuous Connectivity To An Access Point Or Gateway In A Wireless Network Following An On-Demand Routing Protocol, and To Perform Smooth Handoff of Mobile Terminals Between Fixed Terminals in the Network", published on Jul. 22, 2004, the entire content being incorporated herein by reference.

Figure 3A:
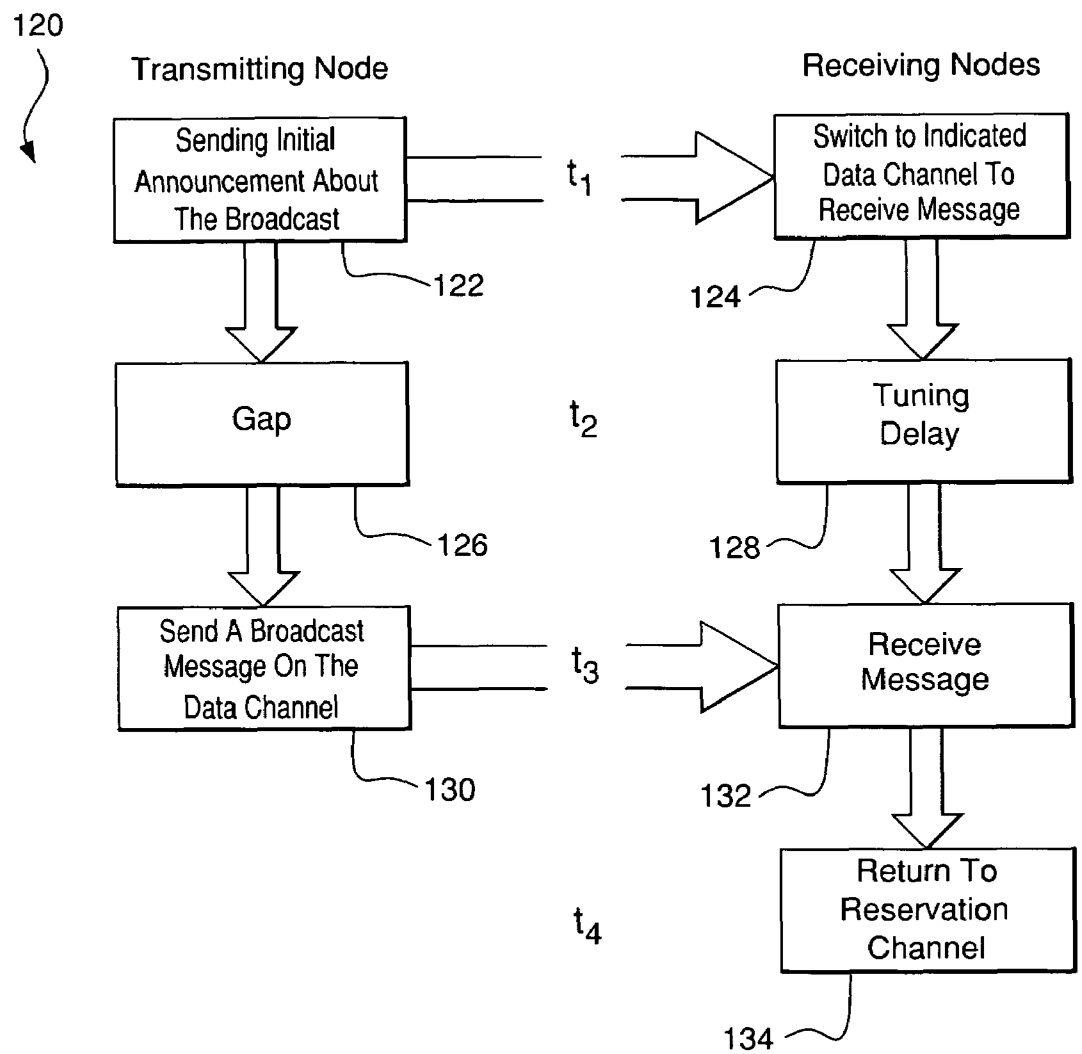
FIG. 3A is a flow chart diagram illustrating a prior art short message communication.
Figure 3B:
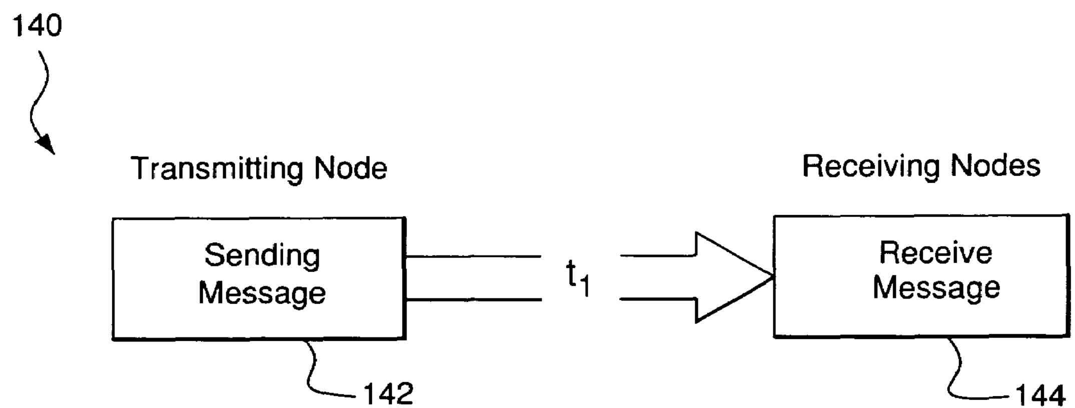
FIG. 3B is a flow chart diagram illustrating an implementation of an embodiment of the present invention in a short message communication.

A flow chart representing the operation of the embodiment described above is shown in FIGS. 3A and 3B. FIG. 3A is a flow chart diagram illustrating a known short message communication technique. FIG. 3B is a flow chart diagram illustrating an implementation of an embodiment of the present invention in a short message communication between data terminals, such as nodes 102, 106 and 107.

In FIG. 3A, a first data terminal, or transmitting node sends an initial announcement about a broadcast at 122. A receiving node switches to an indicated data channel to receive the message at 124. The sending and receiving of this initial announcement results in a first time delay $t_1$. The transmitting node then provides a gap at 126, during which the receiving node re-tunes to the proper data channel at 128, resulting in a second time delay $t_2$. The broadcast message is sent at 130 and received at 132, resulting in a third time delay $t_3$. The receiving node then returns to the reservation channel at 134, resulting in a fourth time delay $t_4$. The cumulative time of the successful communication illustrated in FIG. 3A therefore is the sum of time delays $t_{1-4}$.

In an embodiment of the present invention however shown in FIG. 3B, where messages are of a size less than or similar to an RTS message, a first data terminal, or transmitting node can send the message at 142 on the reservation channel. Therefore, the communication model shown in FIG. 3B includes merely time delay $t_1$. The remaining delays of FIG. 3A have been eliminated.

The embodiment described above is highly efficient as nodes need not waste time in returning to different channels.

Also, the embodiment mitigates hidden/exposed node problems as it increases the channel awareness among the nodes of the network.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A method for communicating between nodes in an ad-hoc multi-channel medium access control (MAC) communication network, wherein the ad-hoc multi-channel MAC communication network comprises a reservation channel for communicating handshake messages relating to each of a plurality of data packet transmissions, and a data channel for communicating the data packet transmissions upon successful handshake on the reservation channel, the method comprising:

comparing a size of a data packet message to a predetermined maximum size;

wherein the predetermined maximum size is a size of Request-To-Send (RTS) message;

transmitting the data packet message from a source node to a destination node over the reservation channel as an initial message between the source and destination nodes when the size of the data packet message is less than the predetermined maximum size; and performing a request-to-send/clear-to-send handshake on the reservation channel between the source and destination nodes when the size of the data packet message is at least the predetermined maximum size, and transmitting the data packet message from the source node to the destination node over the data channel when the request-to-send/clear-to-send handshake is successful.

2. A method as claimed in claim 1, wherein: when the size of the data packet message is less than the predetermined maximum size, the data packet message comprises one of a hello message, a neighbor advertisement, a broadcast message, and a small unicast message.

3. A method as claimed in claim 1, wherein: when the size of the data packet message is less than the predetermined maximum size, the data packet message transmitted over the reservation channel includes at least one of the following: information about congestion in the ad-hoc multi-channel MAC communication network around the source and destination nodes, information regarding activity of other nodes in the ad-hoc multi-channel MAC communication network, information pertaining to a device type of the source node or the destination node, and information pertaining to a mobility level of the source node or the destination node.

4. A method as claimed in claim 1, wherein: the source and destination nodes are mobile nodes operating using a multi-channel medium access control (MAC) protocol.

5. A method as claimed in claim 1, further comprising: assigning a special type indicator to the data packet message when the size of the data packet message is less than the predetermined maximum size, wherein the transmitting of the data packet message over the reservation channel further comprises transmitting the special type indicator along with the data packet message.

6. A method as claimed in claim 1, wherein the data packet message is transmitted over the reservation channel using at least one of a constant power and a constant data rate.

7. A method as claimed in claim 4, wherein the medium access control (MAC) protocol comprises carrier sense multiple access with collision avoidance.

8. A method as claimed in claim 4, wherein the medium access control (MAC) protocol comprises multiple access with collision avoidance.

9. A method as claimed in claim 1, further comprising: tuning the source node and the destination node to the reservation channel prior to the comparing; and tuning the source node and the destination node to the data channel prior to transmitting the data packet over the data channel when the request-to-send/clear-to-send handshake is successful.

10. An ad-hoc multi-channel medium access control (MAC) communication network including a plurality of nodes operating within, the ad-hoc multi-channel MAC communication network comprising:

a reservation channel for communicating handshake messages relating to each of a plurality of data packet transmissions among the plurality of nodes;

a data channel for communicating the plurality of data packet transmissions among the plurality of nodes upon successful handshake on the reservation channel; and the plurality of nodes including at least one source node and at least one destination node, the source node operating to: compare a size of a data packet message to a predetermined maximum size, wherein the predetermined maximum size is a size of Request-To-Send (RTS) message;

transmit the data packet message to the destination node over the reservation channel as an initial message with the destination node when the size of the data packet message is less than the predetermined maximum size, and perform a request-to-send/clear-to-send handshake on the reservation channel with the destination node when the size of the data packet message is at least the predetermined maximum size, and transmit the data packet message to the destination node over the data channel when the request-to-send/clear-to-send handshake is successful.

11. A system as claimed in claim 10, further comprising: the destination node operating to: receive the data packet message over the reservation channel when the size of the data packet message is less than the predetermined maximum size, perform the request-to-send/clear-to-send handshake on the reservation channel with the source node when the size of the data packet message is at least the predetermined maximum size, and receive the data packet message from the source node over the data channel when the request-to-send/clear-to-send handshake is successful.

12. A system as claimed in claim 10, wherein: when the size of the data packet message is less than the predetermined maximum size, the data packet message comprises one of a hello message, a neighbor advertisement, a broadcast message, and a small unicast message.

13. A system as claimed in claim 10, wherein: when the size of the data packet message is less than the predetermined maximum size, the data packet message transmitted over the reservation channel includes at least one of the following: information about congestion in the ad-hoc multi-channel MAC communication network around the source and destination nodes, information regarding activity of other nodes in the ad-hoc multi-channel MAC communication network, information pertaining to a device type of the source node or the destination node, and information pertaining to a mobility level of the source node or the destination node.

14. A system as claimed in claim 10, wherein: the source and destination nodes are mobile nodes operating using a multi-channel medium access control (MAC) protocol.

15. A system as claimed in claim 10, wherein: when the size of the data packet message is less than the predetermined maximum size, the data packet message includes a special type indicator transmitted over the reservation channel.

16. A system as claimed in claim 14, wherein the medium access control (MAC) protocol comprises carrier sense multiple access with collision avoidance.

17. A system as claimed in claim 14, wherein the medium access control (MAC) protocol comprises multiple access with collision avoidance.

* * * * *

UNITED STATES PATENT AND TRADEMARK OFFICE

CERTIFICATE OF CORRECTION

PATENT NO. : 7,734,809 B2
APPLICATION NO. : 10/863453
DATED : June 8, 2010
INVENTOR(S) : Joshi et al.

It is certified that error appears in the above-identified patent and that said Letters Patent is hereby corrected as shown below:

Title Page, Item (75), under "Inventors", in Column 1, Line 3, delete "Guenael" and insert -- Guénaël --, therefor.

In Column 4, Line 48, delete "returning" and insert -- retuning --, therefor.

In Column 6, Line 67, delete "returning" and insert -- retuning --, therefor.

Signed and Sealed this
Twenty-fourth Day of July, 2012

David J. Kappos
*Director of the United States Patent and Trademark Office*